Figure 1:
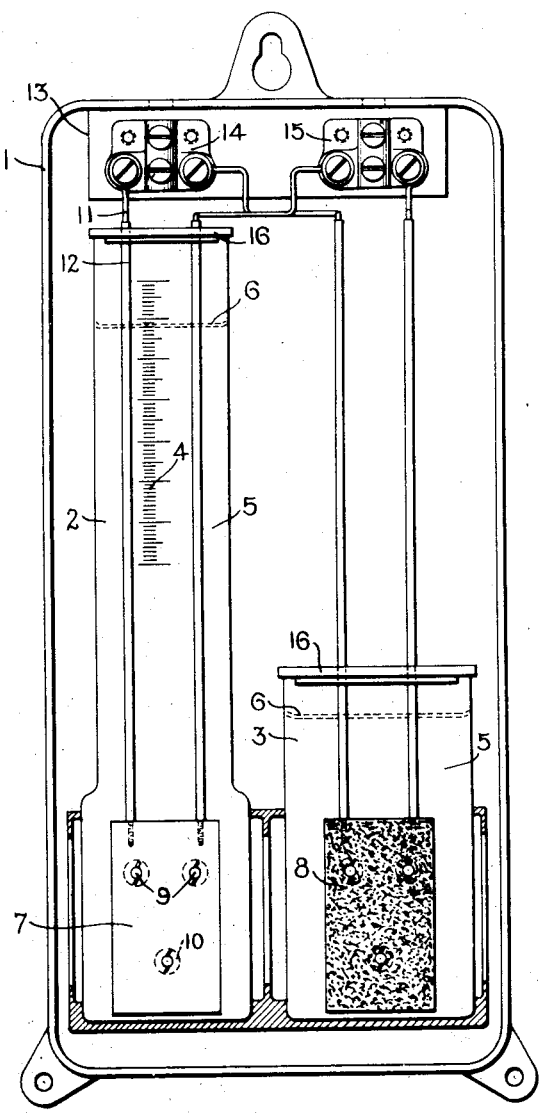

No. 873,098. PATENTED DEC. 10, 1907.
E. SCHATTNER.
METER.
APPLICATION FILED MAR. 24, 1905.

2 SHEETS—SHEET 1.

Witnesses

Inventor
Ernest Schattner
by
Att'y.

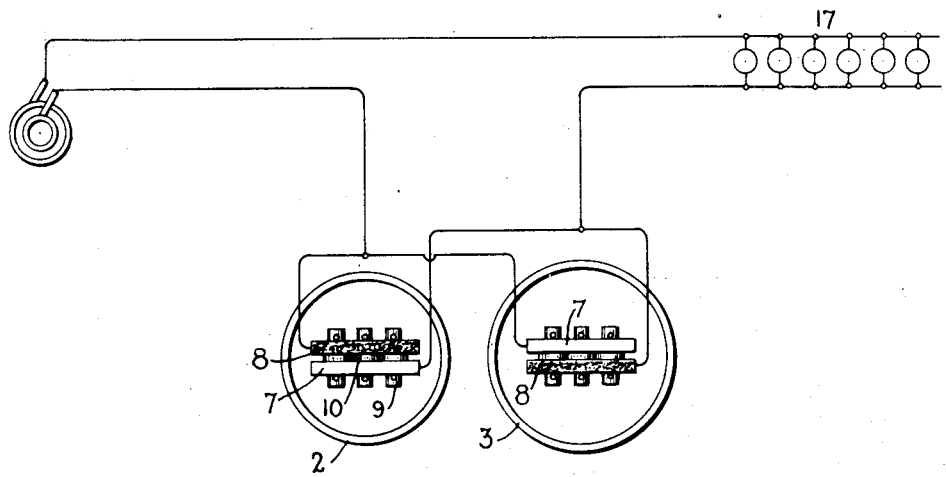

UNITED STATES PATENT OFFICE.

ERNEST SCHATTNER, OF SCHENECTADY, NEW YORK, ASSIGNOR TO GENERAL ELECTRIC COMPANY, A CORPORATION OF NEW YORK.

METER.

No. 873,098.      Specification of Letters Patent.      Patented Dec. 10, 1907.

Application filed March 24, 1905. Serial No. 251,778.

*To all whom it may concern:*

Be it known that I, ERNEST SCHATTNER, a subject of the King of Great Britain, residing at Schenectady, county of Schenectady, State of New York, have invented certain new and useful Improvements in Meters, of which the following is a specification.

This invention relates to a meter for measuring the energy or a factor of the energy supplied to electric translating devices.

More particularly the invention relates to an integrating ampere meter depending for its operation upon electrolysis.

The object of the invention is to provide a simple and inexpensive meter for use on alternating current circuits.

It has long been known that a couple composed of an aluminium plate and a plate of good non-oxidizing material, such as carbon, placed in a neutral conducting solution will offer a very low resistance to the passage of current therethrough in one direction but almost entirely prevent the flow of current in the opposite direction. Such a device is commonly termed an electrolytic valve. I utilize this principle to produce an integrating ampere meter for alternating currents by connecting two of the valves in parallel with each other and in series in the circuit with the plates of one valve oppositely arranged relatively to those of the other, and employing a solution which will be decomposed by the current passing therethrough. With this arrangement a current impulse flows from the carbon as anode to the aluminium as cathode of one valve, since that is the path of least resistance, while a current impulse of opposite sign passes in a similar manner through the other valve, and the amount of decomposition of the electrolyte that takes place is a measure of the current consumed. In practice I find that the two couples should be placed in separate baths as otherwise there would be more or less leakage from one to the other without electrolysis. The plates of each couple should be arranged close together in order that the drop in voltage through the meter shall be small. Also the conductivity of the electrolyte should be as high as other considerations permit for this same reason. I have used a solution of Rochelle salts as an electrolyte with very good results but other solutions may be used if desired and I do not wish to be understood as limited in this respect.

My invention will be better understood by reference to the following description taken in connection with the accompanying drawings which show the preferred embodiment of my invention and in which Figure 1 is a front view of the meter having the cover removed; and Fig. 2 is a diagrammatic view showing the electrical connections.

The novel features of my invention will be definitely set forth in the appended claims.

Referring to the drawings, 1 indicates an iron casting forming the back of the meter in which are mounted two jars or containers 2 and 3. One of these jars 2 is provided with an elongated neck and is made of glass and provided with scale markings upon the neck as indicated at 4. If desired, however, this jar may be made of any suitable material other than glass and a long strip of glass having the scale markings thereon set vertically in the elongated neck. The other jar 3 may be similar to the jar 2, but as the amount of the electrolyte decomposed in each jar is practically the same this is not necessary. The jar 3 may therefore be shaped as shown in Fig. 1 and may be of glass or any other suitable material. Each jar is filled almost to the top with an electrolyte 5 which is a conductor and which will be decomposed by the passage of current therethrough. For this purpose I prefer to use a solution of Rochelle salts. A thin film 6 of paraffin or other suitable material may be placed on top of the solution to prevent loss by evaporation, and this film may be colored so that the height of the electrolyte in the neck of the jar 2 may be more readily observed through the glass. In each of the jars immersed in the electrolyte is a pair of plates which with the electrolyte form an electrolytic valve, that is, they permit the free flow of current in one direction therethrough and offer such a high resistance to the flow of current in the opposite direction as to become practically an insulator. I make these plates one of aluminium and the other of carbon as indicated at 7 and 8 respectively, though other materials may be used instead. They are held close together and parallel to each other by insulated bolts 9 passing through the two plates but actual contact between the plates is prevented by washers 10 of insulating material such as fiber on the bolts 9 and between the plates.

Connected to each plate is a conductor 11 extending up through the open end of the jar and insulated from the electrolyte preferably by means of a rubber tube 12 fitting tightly on the conductor. In the upper part of the casing is a wooden connection block 13 on which are two binding posts 14 and 15. The binding post 14 is connected to the carbon plate 8 of one element and the aluminium plate 7 of the other element by the insulated conductors 11; the other two plates are similarly connected to the binding post 15, so that the carbon of one cell is connected to the aluminium of the other. The binding posts 14 and 15 are also provided with means for securing the leads from the circuit thereto. Covers 16 rest upon the open ends of the jars and are provided with openings for the conductors 11 and for the escape of gases. A cover plate closes the front of the meter casing having a glass-covered opening therein to facilitate taking readings of the meter and openings are provided in the back 1 for the admission of the leads from the circuit to the binding posts 14 and 15.

It will be seen that when the meter is connected in series in one of the lines of an alternating current circuit by inserting the line terminals through the openings in the meter casing and into the binding posts 14 and 15, the two electrolytic valves will be oppositely arranged relatively and connected in parallel with each other and in series in the circuit, as shown in Fig. 2. When lights 17 or other translating devices are cut into circuit, a current impulse in one direction will flow through one of the valves as that offers a very low resistance and as the other is practically an insulator, and a current impulse in the opposite direction will flow through the other element, that being the path of the least resistance. The current flowing between the two plates in the jar 2 is therefore always in the same direction, and the water of the electrolyte in the jar will be slowly decomposed by this current. The amount of the electrolyte decomposed as indicated by the surface of the liquid falling on the scale 4, is a measure of the amount of current consumed and this scale may be calibrated to read directly in ampere hours.

I do not wish to be understood as limited to the construction which I have herein shown and described nor to the use of the materials which I have mentioned herein, as others may be employed with very good results. Modifications in these respects I consider within the scope of my invention and I aim to cover them in the claims appended hereto.

What I claim as new, and desire to secure by Letters Patent of the United States, is,—

1. In combination with an alternating-current circuit, an electrolytic meter comprising an electrolytic valve having electrodes and electrolyte adapted to permit the flow of current impulses in one direction only, a shunt around said valve adapted to permit the flow of current impulses in the opposite direction, and means for indicating the amount of electrolytic decomposition in said valve.

2. An electrolytic meter comprising two electrolytic valves oppositely arranged in parallel with each other, each valve comprising electrodes and electrolyte adapted to transmit current impulses in one direction only, and means to indicate the amount of electrolytic decomposition.

3. An electrolytic meter comprising two electrolytic valves each composed of an aluminium and a carbon plate immersed in an electrolyte oppositely arranged in parallel with each other, means for connecting said valves in series in a circuit, and means to indicate the amount of electrolytic decomposition.

4. An electrolytic meter comprising two electrolytic valves each composed of an aluminium and a conducting plate immersed in a solution of Rochelle salts oppositely arranged in parallel with each other, means for connecting said valves in series in a circuit, and means to indicate the amount of decomposition of said solution.

In witness whereof I have hereunto set my hand this 22nd day of March, 1905.

ERNEST SCHATTNER.

Witnesses:
BENJAMIN B. HULL,
HELEN ORFORD.